United States Patent [19]

Bürge et al.

[11] Patent Number: 4,686,252

[45] Date of Patent: Aug. 11, 1987

[54] PROCESS FOR PREPARING A BUILDING AND/OR CONSTRUCTION MATERIAL, A POLYMER MODIFIED AQUEOUS DISPERSION, AND USE THEREOF FOR THE PREPARATION OF A BUILDING AND/OR CONSTRUCTION MATERIAL

[75] Inventors: Theodor A. Bürge, Geroldswil; Reinhard Schweizer, Winterthur, both of Switzerland

[73] Assignee: Sika AG, vorm. Kaspar Winkler & Co., Zurich, Switzerland

[21] Appl. No.: 819,271

[22] Filed: Jan. 16, 1986

[30] Foreign Application Priority Data

Nov. 22, 1985 [CH] Switzerland ............... 4997/85

[51] Int. Cl.$^4$ .................................. C08K 3/00
[52] U.S. Cl. ............................ 524/3; 524/5; 524/8
[58] Field of Search ............... 524/5, 8; 523/130

[56] References Cited

U.S. PATENT DOCUMENTS

| | | | |
|---|---|---|---|
| 2,646,846 | 7/1953 | Cutforth | 523/130 |
| 4,059,553 | 11/1977 | Tohyama et al. | 524/5 |
| 4,088,804 | 5/1978 | Cornwell et al. | 524/5 |
| 4,495,228 | 1/1985 | Cornwell | 427/393.5 |
| 4,547,331 | 10/1985 | Batstra | 264/109 |

FOREIGN PATENT DOCUMENTS

| | | | |
|---|---|---|---|
| 54-20030 | 2/1979 | Japan | 524/5 |
| 55-162465 | 12/1980 | Japan | 524/5 |
| 59-106912 | 6/1984 | Japan | 524/5 |
| 2069477 | 8/1981 | United Kingdom | 524/5 |

OTHER PUBLICATIONS

Designation: C 294-69 ASTM "Standard Descriptive Nomenclature of Constituents of Natural Mineral Aggregates" pp. 211-219.
The Physical Chemistry of the Silicates by Eitel, pp. 13-14,55-58 & 245 Lehrbuch Der Anorganischen Chemie, pp. 324 & 412.
Anorganische Chemie, p. 394.
Calcium, pp. 861,888-889, 894, 896.

*Primary Examiner*—Joseph L. Schofer
*Assistant Examiner*—N. Sarofim
*Attorney, Agent, or Firm*—Burns, Doane, Swecker & Mathis

[57] ABSTRACT

For the preparation of a building and/or construction material a polymer modified, aqueous dispersion, containing amorphous silicon dioxide and at least one polymer, is mixed and reacted with at least one inorganic binder, and occasionally with at least one aggregate, and hardens thereby.

The polymer modified, aqueous dispersion contains amorphous silicon dioxide and at least one polymer.

This polymer modified, aqueous dispersion is used for the preparation of a building and/or construction material.

23 Claims, No Drawings

PROCESS FOR PREPARING A BUILDING AND/OR CONSTRUCTION MATERIAL, A POLYMER MODIFIED AQUEOUS DISPERSION, AND USE THEREOF FOR THE PREPARATION OF A BUILDING AND/OR CONSTRUCTION MATERIAL

BACKGROUND OF THE INVENTION

1. Field of the Invention

The present invention is directed to a process for preparing a building and/or construction material; to a polymer modified aqueous dispersion; and to the use thereof for the preparation of a building and/or construction material.

The characteristics of a building and construction material, which hardens with water, depend in general on the characteristics of the binder matrix. This matrix is responsible that the aggregates as well as occasionally the reinforcing elements, fibers, wires, networks and so on, are bonded together as well as possible. The porosity of this matrix is responsible for the stability, the durability, the wear resistance and many other use characteristics. Thereby the porosity is in a reverse relation to quality and durability, i.e. the lower the porosity the higher the quality and the durability, respectively.

According to the Austrian Patent No.312 490 and the Swiss Patent No.574 880 such matrix, having the highest stabilities, may be achieved by adding amorphous silicon dioxide and a water reducing agent to the cement. In the DE-OS No. 33 43 948 it is suggested to add such a mixture in the form of a slurry to the concrete, in order to prepare together with an air entraining admixture an air entrained concrete without loss of strength. However, without a further stabilization these mixtures cannot be stored over a long period of time because they gelatinize and thereby they can only be processed further with the highest difficulties.

SUMMARY OF THE INVENTION

Hence, it is a general object of the present invention to provide a stable, polymer modified, aqueous dispersion, containing amorphous silicon dioxide, which improves inorganic building and construction materials in an unexpected way.

A further object of this invention is to provide a process for preparing a building and/or construction material.

The above objects are realized by the inventions as defined in the independent claims. Preferred embodiments of this invention are defined in the dependent claims.

Amorphous silicon dioxide, which is suitable for the process of this invention, is a by-product of the preparation of silicon, ferrous silicon or by the combustion of silicon dioxide containing parts of plants, such as for example rice shells or peat. Of course, chemically produced or pyrogenous silicon dioxide can also be used.

The active content of amorphous silicon dioxide is, in dependency on the process of its preparation, between 50 and 100% by weight, and the specific surface (BET) according to Brunauer-Emmet-Teller is 10–30 $m^2/g$, whereby the upper limit is 400 $m^2/g$. The combination of polymers with amorphous silicon dioxide makes it possible to reduce the porosity of a cement matrix by up to 85%.

DETAILED DESCRIPTION OF THE INVENTION

The use possibilities of the inventive polymer modified aqueous dispersion of amorphous silicon dioxide have hardly any limitations; they range from lime and gypsum to magnesium, phosphate and cement mortars; from light, normal and heavy concrete to fibre reinforced products; from asbestos substitute, spray mortar and spray concrete, to metal substitute in foundries and ceramic substitute.

Quite surprisingly it was also been found that the gelatinization of the polymer modified dispersion of amorphous silicon dioxide can be avoided when during its preparation a polymeric acid is added as dispersion agent as well as organic hydroxyl, polyhydroxyl and/or nitrogen compounds as a viscosity controlling agent.

The preparation of the inventive dispersion is preferably realized in a high-speed mixer (dissolver), whereby preferably first the dispersion aid and the viscosity controlling agent is predissolved in water, and then is added the amorphous silicon oxide and is homogenously distributed. Then follows the addition of the polymer(s) and occasionally of the setting accelerator or the setting retarder.

The polymer modified aqueous dispersion according to the invention is characterized in that it has preferably the following general composition:

1–60% by weight of water emulsified and/or dispersed and/or dissolved polymers,
5–75% by weight of amorphous silicon dioxide,
0–5% by weight of at least one dispersing aid,
0–15% by weight of at least one viscosity controlling, agent,
0–20% by weight of at least one plasticizing agent and-/or setting retarder and/or setting accelerator,
0–30% by weight of at least one inorganic phosphorous containing compound, and
24–94% by weight of water.

The aqueous dispersion is then mixed and reacted with at least one inorganic binder. Furthermore, optionally an aggregate can be added to this mixture. The resulting mixture is a hardened building or construction material in accordance with the invention.

Exemplary inorganic binders which can be used in the invention include Portland cements; white cements; high alumina cements; cements mixed with fly ash, slag, or puzzuolan; calcium hydroxide; calcium sulfate dihydrate; calcium sulfate hemihydrate; calcium sulfate anhydrite; calcium oxide; magnesium oxide and/or magnesium hydroxide.

A building material produced in accordance with the invention can also optionally contain added aggregates. Suitable aggregates include natural lime or siliconatious containing sands and, gravel, quartz, basalt and/or artificially prepared materials such as silica carbide, alumina oxide, boron carbide, iron, iron carbide, expanded clay, expanded slate, perlite vermiculite, foam plastics, glass microspheres, and expanded fly ash. Any one of the above aggregates or a combination thereof can be used in the improved building material according to the invention.

Polymers employed in accordance with the invention include water emulsified polymers such as epoxy resins or polyamine hardeners. Additional polymers which can be added to amorphous silicon dioxide include polymers which are dispersed in water such as homo and copolymers of vinyl esters, acrylic acid esters, styrene, butadiene, or vinylhalogen compounds. Additionally, water dissolved polymers can be used which include sulfonated-s-amino triazine resins, sulfamine acid-melamine resins, urea resins, aldehyde resins of aromatic sulfonic acids and carboxylated resins.

An exemplary dispersing agent used in accordance with the invention includes a polyacrylic acid.

The viscosity controlling agents are generally monovalent or polyvalent alcohols and/or glycol ethers. The viscosity controlling agents can also be compounds having the general formula:

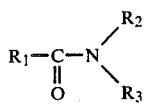

wherein $R_1$ is $NH_2-$ or $-(CH_2)n-$ $R_2$ is $H-$ or $-(CH_2)_m-$ $R^3$ is $H-$ or analkyl group, especially $-CH_3$ whereby n and m are each the numbers from 1–5. The added viscosity controlling agents can be used alone or in conjunction with each other and are generally predissolved in water.

Additional additives which can be employed in conjunction with the novel dispersion in accordance with the invention include setting retarders, setting accelerators and/or plasticizing agents. Exemplary plasticizing agents which can be employed include sulfonated melamine-formaldehyde resins, sulfonated naphthalene-formaldehyde resins, lignin sulfonates, or salts of polyhydroxycarboxylic acids. Exemplary setting retarders include phosphates such as ortho, pyro, polyphosphoric acid or their acidic reacting salts of mono or polyvalent cations. An exemplary setting accelerator includes calcium sulphate.

The following examples are further illustrative of the present invention, but it is understood that the invention is not limited thereto.

EXAMPLE 1

20% by weight styrene-butylacrylate copolymer
25% by weight amorphous silicondioxide
7.5% by weight sulfonated amino-s-triazine resin
46.5% by weight water
1.0% by weight ethylene glycol

| Flexural and compressive strength in N/mm² | | | | | | |
|---|---|---|---|---|---|---|
| (Portland cement - sand - mortar) The following abbreviations are used: F means flexural strength C means compressive strength | | | | | | |
| | 3 days | | 7 days | | 28 days | |
| | F | C | F | C | F | C |
| test with prior art specimen | 3.9 | 29.7 | 5.1 | 37.7 | 5.3 | 44.0 |
| with 20% by weight of inventive dispersion, referred to the binder | 5.8 | 38.7 | 6.9 | 49.8 | 10.0 | 55.3 |

| Bond strength in N/mm² | | |
|---|---|---|
| | 7 days | 28 days |
| test with prior | 1.7 | 2.5 |
| art specimen with 20% by weight of inventive dispersion, referred to the binder | 2.2 | 3.5 |

EXAMPLE 2

25.0% by weight water
2.5% by weight urea
25.0% by weight amorphous silicon dioxide
5.0% by weight sulfonated amino-s-triazine resin
40.0% by weight styrene-butylacrylate copolymer
2.5% by weight sodium dihydrogen phosphate

| Flexural and compressive strength in N/mm² | | | | | | |
|---|---|---|---|---|---|---|
| (Portland cement - sand - mortar) | | | | | | |
| | 3 days | | 7 days | | 28 days | |
| | F | C | F | C | F | C |
| test with prior art specimen | 3.9 | 29.7 | 5.1 | 37.7 | 5.3 | 44.0 |
| with 20% by weight of inventive dispersion, referred to the binder | 5.9 | 38.9 | 7.2 | 51.2 | 11.0 | 58.4 |

EXAMPLE 3

Dispersion A:
  38% by weight water
  2% by weight polymeric acrylic acid
  25% by weight amorphous silicon dioxide
  4% by weight naphthalene sulfonic acid-formaldehyde-condensate
  31% by weight epoxy resin
Dispersion B:
  45% by weight water
  2% by weight polymeric acrylic acid
  35% by weight amorphous silicon dioxide
  5% by weight naphthalene sulfonic acid formaldehyde-condensate
  13% by weight epoxy resin hardener

| Flexural and compressive strength in N/mm² | | | | | | |
|---|---|---|---|---|---|---|
| (Portland cement - sand - mortar) | | | | | | |
| | 24 hours | | 7 days | | 28 days | |
| | F | C | F | C | F | C |
| test with prior art specimen | 3.5 | 13.3 | 8.6 | 33.7 | 11.9 | 49.6 |
| with each 10% per weight of inventive dispersion, referred to the binder | 5.0 | 26.2 | 8.7 | 52.8 | 11.2 | 67.0 |

EXAMPLE 4

54.3–68.9% by weight water
2.0% by weight polymeric acrylic acid 20.0% by weight amorphous silicon dioxide
4.5% by weight sulfonated amino-s-triazine resin
4.6-19.2% by weight styrene-butadiene copolymer Flexural and compressive strength in N/mm²
(Portland cement - sand - mortar)
Mortar with 4.6% by weight styrene-butadiene
copolymer in comparison to the inventive dispersions with
decreased content of styrene-butadiene copolymer.

| inventive dispersion | % by weight copolymer | 24 hrs F | 24 hrs C | 3 days F | 3 days C | 7 days F | 7 days C | 28 days F | 28 days C |
|---|---|---|---|---|---|---|---|---|---|
| without | 4.6 | 4.3 | 17.0 | 4.4 | 28.2 | 6.0 | 36.2 | 7.8 | 43.1 |
| with | 2.3 | 4.8 | 21.4 | 4.9 | 36.0 | 7.3 | 44.3 | 7.4 | 49.9 |
| with | 1.725 | 4.9 | 20.7 | 5.3 | 35.2 | 7.1 | 43.8 | 8.0 | 49.7 |
| with | 1.15 | 4.7 | 20.9 | 5.5 | 35.9 | 6.6 | 44.8 | 9.0 | 46.9 |
| with | 0.575 | 5.1 | 20.7 | 5.3 | 36.2 | 6.4 | 45.0 | 8.8 | 48.4 |

EXAMPLE 5

35% by weight water
5% by weight cycloaliphatic amine
50% by weight amorphous silicon dioxide
5% by weight sulfaminic acid-melamine-cocondensate product
5% by weight methylalcohol.

Viscosity stability, flow properties
measured by the Ford cup method (10 mm)
according to ASTM D 1200

| Measured after | Flow time of a dispersion of 50% by weight of amorphous silicon dioxide and 50% by weight water | Flow time of the inventive dispersion |
|---|---|---|
| immediately | 4.2 seconds | 4.1 seconds |
| 7 days | 37.0 seconds | 5.5 seconds |
| 14 days | no longer measurable | 4.9 seconds |
| 21 days | no longer measurable | 4.7 seconds |
| 28 days | no longer measurable | 4.7 seconds |

TABLE 1

Porosity of the cement matrix
Portland cement 100 parts by weight
Inventive dispersion according to the following
example 5: 0-80 parts by weight
Water cement ratio 0,30

| Inventive Dispersion | Porosity, measured by mercury porosimetrie, Vol. %, referred to the total volume |
|---|---|
| 0 parts by weight | 21.8% |
| 20 parts by weight | 12.25% |
| 40 parts by weight | 7.25% |
| 60 parts by weight | 6.05% |
| 80 parts by weight | 3.59% |

Therewith one gets into the range of ceramic-like characteristics, and the compressive strengths are correspondingly high and achieve more than 150 MPa. Subjected to this also the bond strengths are enormously high, whereby it becomes possible to interlock also smooth, natural, synthetic fibers and steel fibers in such a way that they do not slip out of the matrix but break at a pull out test.

TABLE 2

Compressive and pull out strengths
Portland cement 100 parts by weight
Inventive dispersion according to the following TABLE 2-continued Compressive and pull out strengths
example 4: 0-40 parts by weight

| Inventive Dispersion | 28 days compressive strength N/mm² | 28 days pull out strength of steel N/mm² |
|---|---|---|
| 0 parts by weight | 75 | 1.2 |
| 5 parts by weight | 115 | 2.5 |
| 20 parts by weight | 130 | 4.0 |
| 40 parts by weight | 170 | 4.5 |

As polymers, water emulsified, dispersed or dissolved synthetic resins can be used. These polymers can consist of one component, they can harden by physical means or they can consist of a multicomponent mixture, which hardens by a chemical reaction. They belong to the classes of thermoplastics, duroplasts or elastomers.

Besides the preparation of highly dense products the matrix can also be used to produce thinner elements with the same utility and safety of performance or by addition of light aggregates and/or air voids, to produce products with the same stabilities.

TABLE 3

Light weight concrete with the same 28 days' compressive strength
Portland cement 80 parts by weight
Inventive dispersion according to the following
example 4: 0-40 parts by weight
Air entraining admixture 0-10 parts by weight,
expanded clay 0-15 mm 268 parts by weight,
quartz sand 0-0.5 mm 96 parts by weight.

| Density kg/m³ | 28 days compressive strength N/mm² Inventive dispersion | |
|---|---|---|
| | 0 parts by weight | 40 parts by weight |
| 1450 | 20 | 36 |
| 1550 | 28 | 47 |
| 1650 | 32 | 51 |
| 1750 | 50 | 62 |

Instead of realizing the possible high strength of for example concrete, one can at the same strength reduce the cement content, namely per part by weight of the inventive dispersion 2-4 parts by weight of cement.

TABLE 4

Reduction of cement content
Portland cement 100-60 parts by weight
Inventive dispersion according to the following
example 5: 0-80 parts by weight
Water-cement ratio 0.30

| Portland cement parts by weight | Inventive dispersion parts by weight | 28 days Compressive strength N/mm² |
|---|---|---|
| 100 | 0 | 75 |
| 97.5 | 5 | 95 |
| 90 | 20 | 115 |
| 80 | 40 | 114 |
| 70 | 60 | 110 |
| 60 | 80 | 105 |

The matrix containing the inventive dispersion with an extreme low porosity can be used together with the corresponding filling materials for the preparation of highly abrasion resistant elements. Due to the fact that the amorphous silicon oxide binds the free lime in the cement, chemically resistant products can be produced. The alkali-silicate-reaction is also inhibited.

TABLE 5

Sulfate resistance
Prisms 4 × 4 × 16 cm³

TABLE 5-continued

Sulfate resistance

Portland cement 100 parts by weight
Inventive dispersion according to the
following example 1: 20 parts by weight
Sand 0-3 mm 300 parts by weight
Water-cement ratio 0.4
Storage in a 5% sodium sulfate solution

| Age of the samples in days | Expansion measurements °/∞ Inventive dispersion | |
|---|---|---|
| | 0 parts by weight | 20 parts by weight |
| 3 | 0.142 | 0.071 |
| 7 | 0.213 | 0.106 |
| 28 | 0.248 | 0.106 |
| 56 | 0.390 | 0.106 |
| 90 | 0.497 | 0.106 |
| 180 | 1.136 | 0.177 |
| 360 | destroyed | 0.355 |

We claim:

1. A process for preparing a building and/or construction material comprising admixing a stable aqueous dispersion, containing a noncuring mixture of amorphous silicon dioxide and at least one polymer, with at least one inorganic binder, thereby reacting and hardening the admixture.

2. The process according to claim 1, further comprising admixing the aqueous dispersion with at least one aggregate.

3. The process according to claim 2, the polymer modified, aqueous dispersion comprises the following composition:
   1-60% by weight of in water emulsified and/or dispersed and/or dissolved polymers
   5-75% by weight of amorphous silicon dioxide
   0-5% by weight of at least one dispersing aid
   0-15% by weight of at least one viscosity controlling agent
   0-20% by weight of at least one plasticizing agent and/or setting retarder and/or setting accelerator
   0-30% by weight of at least one inorganic phosphorus containing compound, and
   24-94% by weight of water,
and is added an amount from 5-100% by weight, referred to the binder.

4. The process according to claim 2, wherein at least one cement selected from the group consisting of Portland cement according to ASTM C 150; white cement, high alumina cement; cement mixed with fly ash, slag, puzzuolan; calcium hydroxide; calcium sulfate dihydrate, calcium sulfate hemihydrate; calcium sulfate anhydrite, calcium oxide; magnesium oxide, and magnesiumhydroxide is used as inorganic binder.

5. The process according to claim 4, wherein at least one member of the group consisting of natural lime-containing or silicaceous sands, gravel, quartz, basalt and/or artificially prepared materials, silicon carbide, aluminum oxide, boron carbide, iron, iron carbide, expanded clay, expanded slate, perlite, vermiculite, foamed plastics, glass microspheres, and expanded fly ash is used as aggregate.

6. The process according to claim 5, wherein at least one member of the group consisting of epoxy resins and polyamine hardeners emulsified in water; homo and copolymers of vinyl esters, acrylic acid esters, styrene, butadiene, vinylhalogen compounds dispersed in water; sulfonated amino-s-triazine resins, sulfamine acid-melamine resins, urea resins, aldehyde resins of aromatic sulfonic acids, and carboxylated resins dissolved in water is used as polymer.

7. The process according to claim 3, wherein as amorphous silicon dioxide a material having a specific surface (BET) according to Brunauer-Emmet-Teller from 10 to 400 m²/g and a SiO₂-content from 50 to 100% by weight is used.

8. The process according to claim 3, wherein polyacrylic acid is used as a dispersing aid.

9. The process according to claim 3, wherein monovalent and/or polyvalent alcohols, and/or glycolethers and/or compounds having the general formula

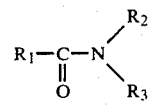

wherein
   $R_1$ is $NH_2-$ or $-(CH_2)_n-$
   $R_2$ is $H-$ or $-(CH_2)_m-$
   $R_3$ is $H-$ or an alkyl group, especially $-CH_3$,
whereby n and m are each the numbers from 1 to 5, are used as viscosity controlling agent.

10. The process according to claim 3, wherein sulfonated melamine-formaldehyde resins, sulfonated naphthalene-formaldehyde resins, lignin sulfonates, or salts of polyhydroxy carboxylic acids are used as plasticizing agent; polyhydroxyl compounds or phosphates are used as setting retarders; and aluminumhydroxide or calcium sulfate are used as setting accelerators.

11. The process according to claim 3, wherein, as phosphorus containing compound, ortho, pyro, polyphosphoric acid or at least one of their acidic reacting salts of a mono or polyvalent cation is used.

12. A stable aqueous dispersion comprising a noncuring mixture of amorphous silicon dioxide and at least one polymer.

13. The dispersion according to claim 12, which comprises the following composition:
   1-60% by weight of in water emulsified and/or dispersed and/or dissolved polymers
   5-75% by weight of amorphous silicon dioxide
   0-5% by weight of at least one dispersing aid
   0-15% by weight of at least one viscosity controlling agent
   0-20% by weight of at least one plasticizing agent and/or setting retarder and/or setting accelerator
   0-30% by weight of at least one inorganic phosphorus containing compound, and
   24-94% by weight of water.

14. The dispersion according to claim 13, wherein the polymers are selected from the group consisting of epoxy resins and polyamine hardeners emulsified in water; homo and copolymers of vinyl esters, acrylic acid esters, styrene, butadiene, vinylhalogen compounds dispersed in water; and sulfonated amino-s-triazine resins, sulfamine acid-melamine resins, urea resins, aldehyde resins of aromatic sulfonic acids and carboxylated resins dissolved in water.

15. The dispersion according to claim 13, which contains as amorphous silicon dioxide a material having a specific surface (BET) according to Brunauer-Emmet-Teller from 10 to 400 m²/g and a SiO₂-content from 50 to 100% by weight.

16. The dispersion according to claim 13, which contains polyacrylic acid as a dispersing aid.

17. The dispersion according to claim 13, which contains as viscosity controlling agent at least one member of the group consisting of monovalent and polyvalent alcohols, glycolethers and compounds having the general formula

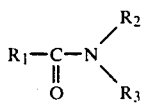

wherein
$R_1$ is $NH_2$— or —$(CH_2)_n$—
$R_2$ is H— or —$(CH_2)_m$—
$R_3$ is H— or an alkyl group, especially —$CH_3$,
whereby n and m are each the numbers from 1 to 5.

18. The dispersion according to claim 15, which contains, as plasticizing agent, sulfonated melamine-formaldehyde resins, sulfonated naphthalene-fomaldehyde resins, lignin sulfonates, or salts of polyhydroxy carboxylic acids; as setting retarders, polyhydroxyl compounds, or phosphates; and as setting accelerators, aluminumhydroxide, or calcium sulfate.

19. The dispersion according to claim 15, which contains as phosphorus containing compound ortho-, pyro-, polyphosphoric acid or at least one of their acidic reacting salts of mono or polyvalent cations.

20. The process of using the polymer modified, aqueous dispersion according to claim 13 for the preparation of a building and/or construction material.

21. The dispersion according to claim 13, wherein the polymer comprises styrene-butylacrylate copolymer.

22. The dispersion according to claim 13, wherein the polymer comprises styrene-butadiene copolymer.

23. The dispersion according to claim 13, wherein the polymer comprises sulfaminic acid-melomine co-condensate product.

* * * * *